United States Patent
Jun et al.

(10) Patent No.: US 10,044,073 B2
(45) Date of Patent: Aug. 7, 2018

(54) METHOD FOR PREVENTING BATTERY SWELLING AND ELECTRONIC DEVICE THEREOF

(71) Applicant: Samsung Electronics Co., Ltd., Suwon-si, Gyeonggi-do (KR)

(72) Inventors: Intae Jun, Daegu (KR); Jae-Young Roh, Gumi-si (KR); Je-Eon Park, Gumi-si (KR); Eunki Na, Gumi-si (KR); Yonghune An, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 124 days.

(21) Appl. No.: 15/142,750

(22) Filed: Apr. 29, 2016

(65) Prior Publication Data

US 2016/0322676 A1   Nov. 3, 2016

(30) Foreign Application Priority Data

Apr. 30, 2015 (KR) ......................... 10-2015-0062094

(51) Int. Cl.
*H01M 10/42* (2006.01)
*H01M 10/44* (2006.01)
*H02J 7/00* (2006.01)
*H01M 10/48* (2006.01)

(52) U.S. Cl.
CPC ..... *H01M 10/4257* (2013.01); *H01M 10/443* (2013.01); *H01M 10/48* (2013.01); *H01M 10/486* (2013.01); *H02J 7/007* (2013.01); *H02J 7/0029* (2013.01); *H02J 7/0063* (2013.01); *H01M 2010/4271* (2013.01); *H01M 2010/4278* (2013.01); *H01M 2220/30* (2013.01); *H02J 2007/0067* (2013.01)

(58) Field of Classification Search
CPC .................................................. H01M 10/4257
USPC ......................................... 320/132, 134-137
See application file for complete search history.

(56) References Cited

U.S. PATENT DOCUMENTS

| | | | |
|---|---|---|---|
| 6,753,625 B2 * | 6/2004 | Kelsey | H02J 7/0031 307/150 |
| 7,994,764 B2 * | 8/2011 | Koleno | G05F 1/575 323/280 |
| 8,217,620 B2 | 7/2012 | Hanssen et al. | |
| 8,415,926 B2 | 4/2013 | Bhardwaj et al. | |
| 8,513,919 B2 | 8/2013 | Bhardwaj et al. | |
| 8,598,849 B2 | 12/2013 | Bhardwaj et al. | |
| 8,854,012 B2 | 10/2014 | Dai et al. | |

(Continued)

FOREIGN PATENT DOCUMENTS

| | | |
|---|---|---|
| CN | 101688901 A | 3/2010 |
| CN | 101739050 A | 6/2010 |

(Continued)

*Primary Examiner* — Samuel Berhanu
*Assistant Examiner* — Tessema Kebede
(74) *Attorney, Agent, or Firm* — Jefferson IP Law, LLP

(57) ABSTRACT

An apparatus and a method for preventing battery swelling in an electronic device are provided. The operating method of an electronic device includes checking a temperature of the electronic device and state of charge (SoC) of a battery, determining whether to discharge the battery based on the temperature of the electronic device and the SoC of the battery, and discharging the battery in response to the battery discharge determination.

20 Claims, 14 Drawing Sheets

(56) References Cited

U.S. PATENT DOCUMENTS

| | | | |
|---|---|---|---|
| 8,896,271 B2 * | 11/2014 | Kim | H01M 10/443 320/136 |
| 9,406,980 B2 * | 8/2016 | Sengupta | H01M 10/443 |
| 9,500,538 B2 * | 11/2016 | Maleki | H01M 10/486 |
| 2010/0117609 A1 | 5/2010 | Koleno | |
| 2010/0191490 A1 | 7/2010 | Martens et al. | |
| 2013/0099757 A1 * | 4/2013 | Ham | H02J 7/0047 320/150 |
| 2014/0111142 A1 | 4/2014 | Lee | |
| 2015/0084600 A1 | 3/2015 | Sengupta et al. | |

FOREIGN PATENT DOCUMENTS

| | | |
|---|---|---|
| CN | 103778076 A | 5/2014 |
| EP | 2 328 224 A1 | 6/2011 |
| EP | 2 712 018 A1 | 3/2014 |
| EP | 2 844 007 A1 | 3/2015 |
| EP | 2 851 701 A2 | 3/2015 |
| EP | 2851701 A2 | 3/2015 |

* cited by examiner

METHOD FOR PREVENTING BATTERY SWELLING AND ELECTRONIC DEVICE THEREOF

CROSS-REFERENCE TO RELATED APPLICATION(S)

This application claims the benefit under 35 U.S.C. § 119(a) of a Korean patent application filed on Apr. 30, 2015 in the Korean Intellectual Property Office and assigned Serial number 10-2015-0062094, the entire disclosure of which is hereby incorporated by reference.

TECHNICAL FIELD

The present disclosure relates to an apparatus and a method for preventing battery swelling in an electronic device.

BACKGROUND

With advances in information communication technology and semiconductor technology, an electronic device can provide various multimedia services to its user using various application programs.

To enhance competitiveness of the electronic device, electronic device manufacturers offer various multimedia services and various electronic device designs. For example, the electronic device can include a slim structure for user portability or an internal battery (integrated battery) structure for the design.

The above information is presented as background information only to assist with an understanding of the present disclosure. No determination has been made, and no assertion is made, as to whether any of the above might be applicable as prior art with regard to the present disclosure.

SUMMARY

In an electronic device having a slim structure, a gap between a display and a battery is reduced. As such, battery swelling can damage the display. In the electronic device including the internal battery, the swollen battery cannot be replaced or the battery change cost can increase.

Aspects of the present disclosure are to address at least the above-mentioned problems and/or disadvantages and to provide at least the advantages described below. Accordingly, an aspect of the present disclosure is to provide an apparatus and a method for preventing battery swelling without an additional hardware module in an electronic device.

In accordance with an aspect of the present disclosure, an electronic device is provided. The electronic device includes a battery, a sensor module, a processor electrically connected to the sensor module, and a memory electrically connected to the processor. The memory stores instructions which, when executed, direct the processor to detect a temperature of the electronic device using the sensor module, to check state of charge (SoC) of the battery, to determine whether to discharge the battery based on the temperature of the electronic device and the SoC of the battery, and to discharge the battery in response to the battery discharge determination.

In accordance with another aspect of the present disclosure, an operating method of an electronic device is provided. The operating method includes checking a temperature of the electronic device and SoC of a battery, determining whether to discharge the battery based on the temperature of the electronic device and the SoC of the battery, and discharging the battery in response to the battery discharge determination.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
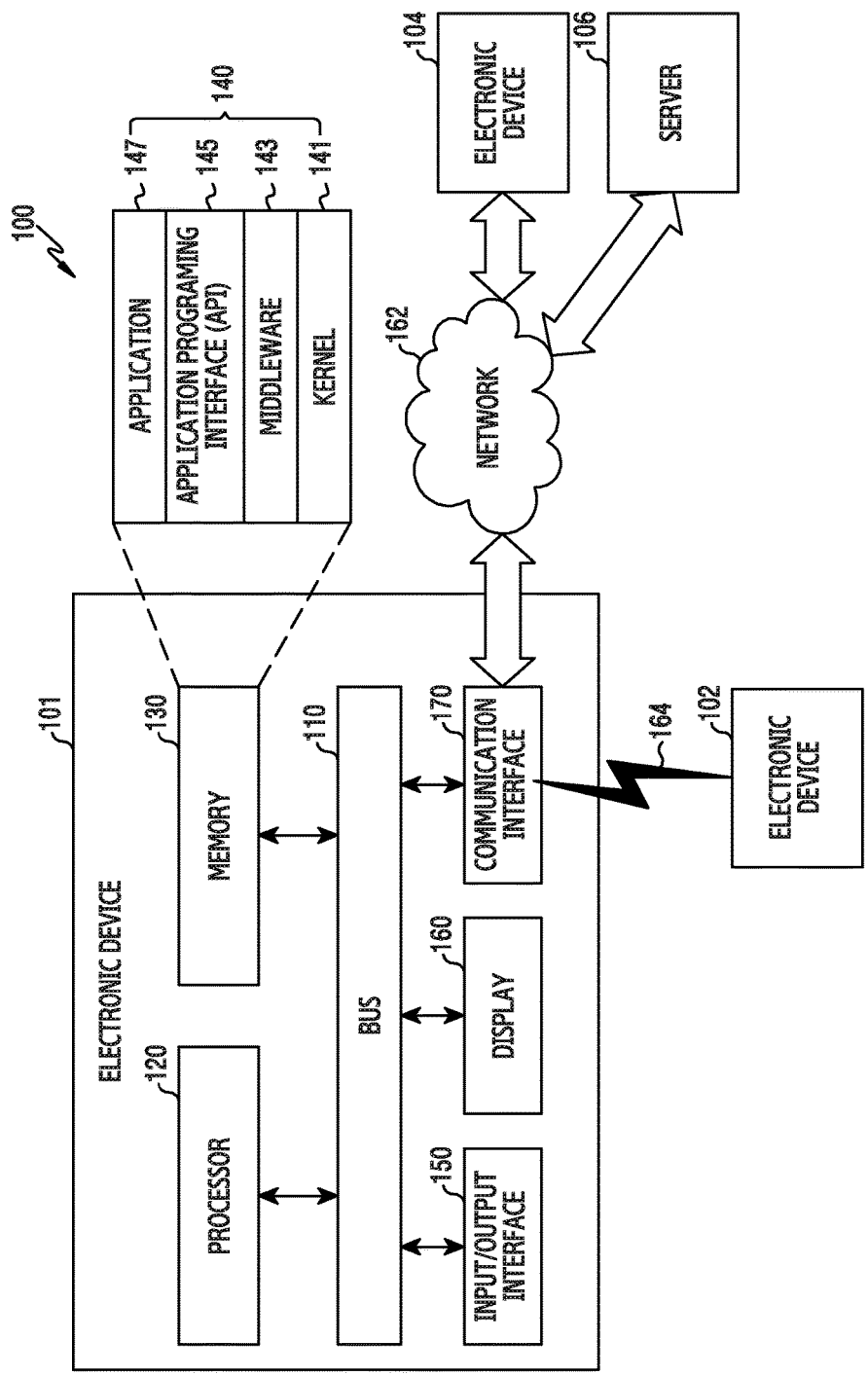
FIG. 1 is a block diagram of an electronic device in a network according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms "have", "may have", "include", or "may include" used in the various embodiments of the present disclosure indicate the presence of disclosed corresponding functions, operations, elements, and the like, and do not limit additional one or more functions, operations, elements, and the like. In addition, it should be understood that the terms "include" or "have" used in the various embodiments of the present disclosure are to indicate the presence of features, numbers, operations, elements, parts, or a combination thereof described in the specifications, and do not preclude the presence or addition of one or more other features, numbers, operations, elements, parts, or a combination thereof.

The terms "A or B", "at least one of A or/and B" or "one or more of A or/and B" used in the various embodiments of the present disclosure include any and all combinations of words enumerated with it. For example, "A or B", "at least one of A and B" or "at least one of A or B" means (1) including at least one A, (2) including at least one B, or (3) including both at least one A and at least one B.

Although the term such as "first" and "second" used in various embodiments of the present disclosure may modify various elements of various embodiments, these terms do not limit the corresponding elements. For example, these terms do not limit an order and/or importance of the corresponding elements. These terms may be used for the purpose of distinguishing one element from another element. For example, a first user device and a second user device all indicate user devices and may indicate different user devices. For example, a first element may be named a second element without departing from the scope of right of various embodiments of the present disclosure, and similarly, a second element may be named a first element.

It will be understood that when an element (e.g., first element) is "connected to" or "(operatively or communicatively) coupled with/to" to another element (e.g., second element), the element may be directly connected or coupled to another element, and there may be an intervening element (e.g., third element) between the element and another element. To the contrary, it will be understood that when an element (e.g., first element) is "directly connected" or "directly coupled" to another element (e.g., second element), there is no intervening element (e.g., third element) between the element and another element.

The expression "configured to (or set to)" used in various embodiments of the present disclosure may be replaced with "suitable for", "having the capacity to", "designed to", "adapted to", "made to", or "capable of" according to a situation. The term "configured to (set to)" does not necessarily mean "specifically designed to" in a hardware level. Instead, the expression "apparatus configured to . . . " may mean that the apparatus is "capable of . . . " along with other devices or parts in a certain situation. For example, "a processor configured to (set to) perform A, B, and C" may be a dedicated processor, e.g., an embedded processor, for performing a corresponding operation, or a generic-purpose processor, e.g., a central processing unit (CPU) or an application processor (AP), capable of performing a corresponding operation by executing one or more software programs stored in a memory device.

Further, all the terms used herein, including technical and scientific terms, should be interpreted to have the same meanings as commonly understood by those skilled in the art to which the present disclosure pertains, and should not be interpreted to have ideal or excessively formal meanings unless explicitly defined in various embodiments of the present disclosure.

An electronic device according to various embodiments of the present disclosure may be a device. For example, the electronic device according to various embodiments of the present disclosure may include at least one of: a smart phone; a tablet personal computer (PC); a mobile phone; a video phone; an e-book reader; a desktop PC; a laptop PC; a netbook computer; a workstation, a server, a personal digital assistant (PDA); a portable multimedia player (PMP); a Moving Picture Experts Group phase 1 or phase 2 (MPEG-1 or MPEG-2) audio layer 3 (MP3) player; a mobile medical device; a camera; a power bank; or a wearable device (e.g., a head-mount-device (HMD), an electronic glasses, an electronic clothing, an electronic bracelet, an electronic necklace, an electronic appcessory, an electronic tattoo, a smart mirror, or a smart watch).

In other embodiments of the present disclosure, an electronic device may include at least one of: a medical equipment (e.g., a mobile medical device (e.g., a blood glucose monitoring device, a heart rate monitor, a blood pressure monitoring device or a temperature meter)); a navigation device; a global navigation satellite system (GNSS); or an internet of things device (e.g., a Lightbulb, various sensors, an electronic meter, a gas meter, a sprinkler, a fire alarm, a thermostat, a streetlamp, a toaster, a sporting equipment, a hot-water tank, a heater, or a boiler and the like)

Herein, the term "user" may indicate a person who uses an electronic device or a device (e.g., an artificial intelligence electronic device) that uses the electronic device.

FIG. 1 illustrates a network environment including an electronic device according to various embodiments of the present disclosure.

Referring to FIG. 1, an electronic device 101 in a network environment 100, according to the various embodiments of the present disclosure, will be described. The electronic device 101 may include a bus 110, a processor 120 (e.g., including processing circuitry), a memory 130, an input/output interface 150 (e.g., including input/output circuitry), a display 160 (e.g., including a display panel and display circuitry), and a communication interface 170 (e.g., including communication circuitry). In an embodiment of the present disclosure, at least one of the elements of the electronic device 101 may be omitted, or other elements may be additionally included in the electronic device 101.

The bus 110 may include, for example, a circuit that interconnects the elements 110 to 170 and transfers communication (e.g., a control message and/or data) between the elements.

The processor 120 may include one or more of a CPU, an AP, and a communication processor (CP). The processor 120 may, for example, perform an operation or data processing on control and/or communication of at least one other element of the electronic device 101.

The memory 130 may include a volatile memory and/or a non-volatile memory. The memory 130 may store, for example, instructions or data (e.g. program information for discharging a battery) relevant to at least one other element of the electronic device 101. According to an embodiment of the present disclosure, the memory 130 may store software and/or a program 140. For example, the program may include a kernel 141, middleware 143, an application programming interface (API) 145, and an application (or "application program") 147. At least some of the kernel 141, the middleware 143, and the API 145 may be referred to as an operating system (OS).

The input/output interface 150, for example, may function as an interface that may transfer instructions or data input from a user or another external device to the other element(s) of the electronic device 101. Furthermore, the input/output interface 150 may output the instructions or data received from the other element(s) of the electronic device 101 to the user or another external device.

Examples of the display 160 may include a liquid crystal display (LCD), a light-emitting diode (LED) display, an organic LED (OLED) display, a microelectromechanical systems (MEMS) display, and an electronic paper display. The display 160, for example, may display various types of content (e.g., text, images, videos, icons, or symbols) to the user. The display 160 may include a touch screen and receive, for example, a touch, gesture, proximity, or hovering input using an electronic pen or the user's body part.

The communication interface 170, for example, may set communication between the electronic device 101 and an external device (e.g., the first external electronic device 102, the second external electronic device 104, or a server 106). For example, the communication interface 170 may be connected to a network 162 through wireless or wired communication to communicate with the external device (e.g., the second external electronic device 104 or the server 106).

The wireless communication may use at least one of, for example, long term evolution (LTE), LTE-advanced (LTE-A), code division multiple access (CDMA), wideband CDMA (WCDMA), universal mobile telecommunications system (UMTS), wireless broadband (WiBro), and global system for mobile communications (GSM), as a cellular communication protocol. In addition, the wireless communication may include, for example, short range communication 164. The short-range communication 164 may be performed by using at least one of, for example, Wi-Fi, Bluetooth (BT), near field communication (NFC), and GNSS. The GNSS may include at least one of, for example, a global positioning system (GPS), a global navigation satellite system (Glonass), a Beidou navigation satellite system (hereinafter, referred to as "Beidou"), and Galileo (European global satellite-based navigation system). Hereinafter, in the present disclosure, the "GPS" may be interchangeably used with the "GNSS". The wired communication may include at least one of, for example, a universal serial bus (USB), a high definition multimedia interface (HDMI), recommended standard-232 (RS-232), and a plain old telephone service (POTS). The network 162 may include at least one of a communication network such as a computer network (e.g., a local area network (LAN) or a wireless area network (WAN)), the Internet, and a telephone network.

Each of the first and second external electronic devices 102 and 104 may be of a type identical to or different from that of the electronic device 101. According to an embodiment of the present disclosure, the server 106 may include a group of one or more servers. According to various embodiments of the present disclosure, all or some of the operations performed in the electronic device 101 may be performed in another electronic device or a plurality of electronic devices (e.g., the electronic devices 102 and 104 or the server 106). According to an embodiment of the present disclosure, when the electronic device 101 has to perform some functions or services automatically or in response to a request, the electronic device 101 may make a request for performing at least some functions relating thereto to another device (e.g., the electronic device 102 or 104 or the server 106) instead of performing the functions or services by itself or in addition. Another electronic device (e.g., the electronic device 102 or 104 or the server 106) may execute the requested functions or the additional functions, and may deliver a result of the execution to the electronic device 101. The electronic device 101 may process the received result as it is or additionally to provide the requested functions or services. To achieve this, for example, cloud computing, distributed computing, or client-server computing technology may be used.

Figure 2:
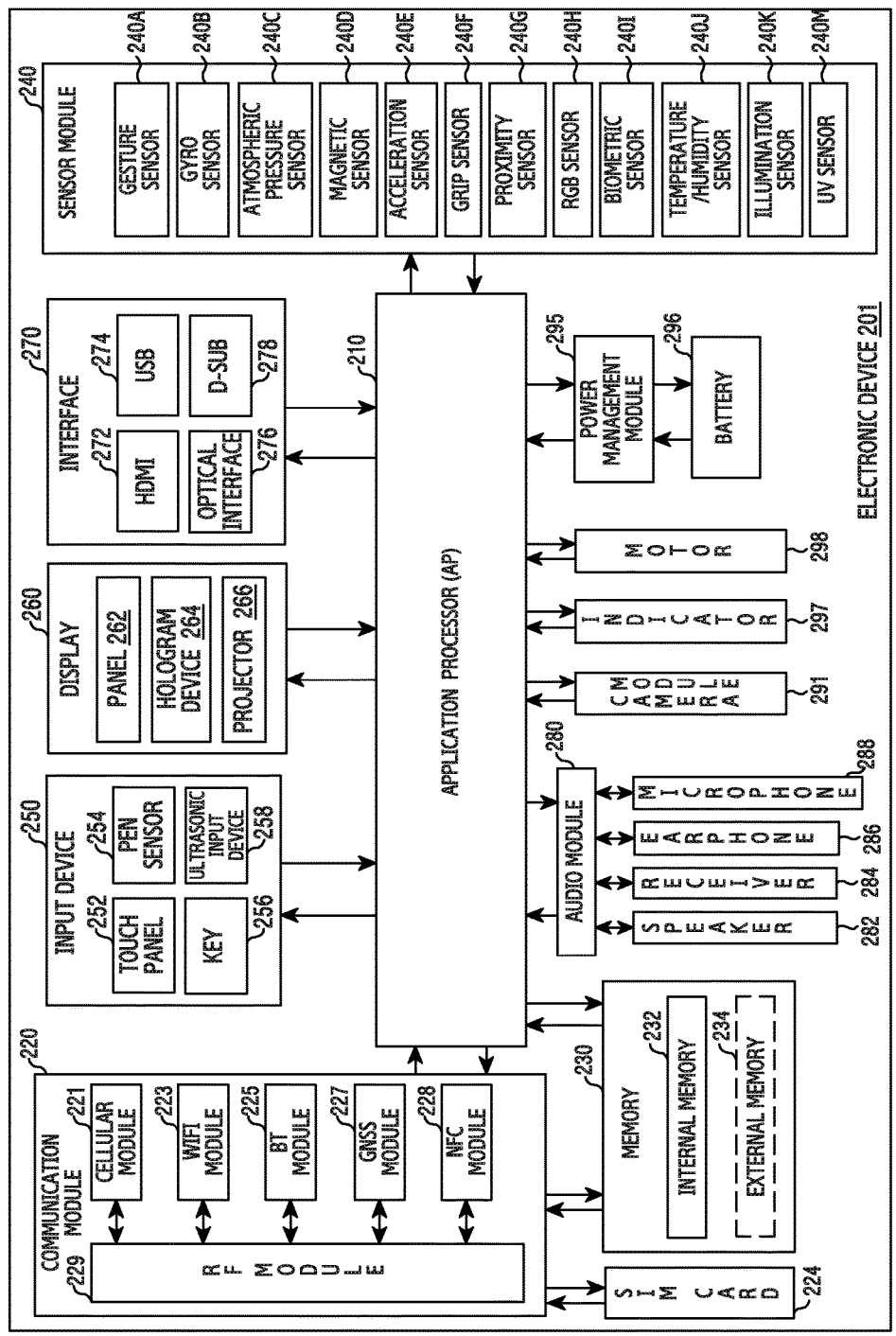
FIG. 2 is a block diagram of an electronic device according to an embodiment of the present disclosure.

FIG. 2 is a block diagram of an electronic device according to various embodiments of the present disclosure.

Referring to FIG. 2, an electronic device 201 may include, for example, all or a part of the electronic device 101 illustrated in FIG. 1. The electronic device 201 may include at least one AP 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The AP 210 may, for example, control a plurality of hardware or software elements connected thereto and perform a variety of data processing and calculations by driving an operating system or application programs. The AP 210 may be implemented as, for example, a system on chip (SoC).

According to an embodiment of the present disclosure, the AP 210 may further include a graphics processing unit (GPU) and/or an image signal processor (ISP). The AP 210 may include at least some of the elements (e.g., a cellular module 221) illustrated in FIG. 2. The AP 210 may load commands or data, received from at least one other element (e.g., a non-volatile memory), in a volatile memory to process the loaded commands or data, and may store various types of data in the non-volatile memory.

The communication module 220 may have a configuration that is the same as or similar to that of the communication interface 170 of FIG. 1. The communication module 220 may include, for example, a cellular module 221, a Wi-Fi module 223, a BT module 225, a GNSS module 227, an NFC module 228, and a radio frequency (RF) module 229. The communication module 220 provides a function of transmitting/receiving a signal. Accordingly, the communication module 220 may be referred to as a "reception unit", a "transmission unit", a "transmission and reception unit", a "communication unit", or the like.

The cellular module 221 may provide, for example, a voice call, a video call, a text message service, or an Internet service through a communication network. According to an embodiment of the present disclosure, the cellular module 221 may distinguish and authenticate the electronic device 201 in the communication network by using a SIM (e.g., the SIM card 224).

According to an embodiment of the present disclosure, the cellular module 221 may perform at least some of the functions that the AP 210 may provide. According to an embodiment of the present disclosure, the cellular module 221 may include a CP.

The Wi-Fi module 223, the BT module 225, the GPS module 227, or the NFC module 228 may include, for example, a processor for processing data transmitted/received through the corresponding module. According to an embodiment of the present disclosure, at least some (e.g., two or more) of the cellular module 221, the Wi-Fi module 223, the BT module 225, the GPS module 227, and the NFC module 228 may be included in a single integrated chip (IC) or IC package.

The RF module 229 may, for example, transmit/receive a communication signal (e.g., an RF signal). The RF module 229 may include, for example, a transceiver, a power amplifier module (PAM), a frequency filter, a low noise amplifier (LNA), or an antenna. According to another embodiment of the present disclosure, at least one of the cellular module 221, the Wi-Fi module 223, the BT module 225, the GPS module 227, and the NFC module 228 may transmit/receive an RF signal through a separate RF module.

The SIM card 224 may include, for example, a card including a SIM and/or an embedded SIM, and may further include unique identification information (e.g., an integrated circuit card identifier (ICCID)) or subscriber information (e.g., international mobile subscriber identity (IMSI)).

The memory 230 may include, for example, an internal memory 232 or an external memory 234. The internal memory 232 may include, for example, at least one of a volatile memory (e.g., a dynamic random access memory (DRAM), a static RAM (SRAM), a synchronous dynamic RAM (SDRAM), or the like) and a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), a hard disk drive, or a solid state drive (SSD)).

The external memory 234 may further include a flash drive, for example, a compact flash (CF), a secure digital (SD), a micro-SD, a mini-SD, an extreme digital (xD), a memory stick, or the like. The external memory 234 may be functionally and/or physically connected to the electronic device 201 through various interfaces.

The sensor module 240 may, for example, measure a physical quantity or detect an operating state of the electronic device 201, and may convert the measured or detected information into an electrical signal. The sensor module 240 may include, for example, at least one of, a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., red, green, and blue (RGB) sensor), a bio-sensor 240I, a temperature/humidity sensor 240J, an illumination sensor 240K, and a ultra violet (UV) sensor 240M. Additionally or alternatively, the sensor module 240 may include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In an embodiment of the present disclosure, the electronic device 201 may further include a processor that is configured as a part of the AP 210 or a separate element from the AP 210 in order to control the sensor module 240, thereby controlling the sensor module 240 while the AP 2710 is in a sleep state.

The input device 250 may include, for example, a touch panel 252, a (digital) pen sensor 254, a key 256, or an ultrasonic input device 258. The touch panel 252 may use at least one of, for example, a capacitive type, a resistive type, an infrared type, and an ultrasonic type. In addition, the touch panel 252 may further include a control circuit. The touch panel 252 may further include a tactile layer to provide a tactile reaction to a user.

The (digital) pen sensor 254 may be, for example, a part of the touch panel, or may include a separate recognition sheet. The key 256 may include, for example, a physical button, an optical key, or a keypad. The ultrasonic input device 258 may identify data by detecting acoustic waves with a microphone (e.g., a microphone 288) of the electronic device 201 through an input unit for generating an ultrasonic signal.

The display 260 (e.g., the display 160) may include a panel 262, a hologram device 264, or a projector 266. The panel 262 may include a configuration that is the same as or similar to that of the display 160 of FIG. 1. The panel 262 may be implemented to be, for example, flexible, transparent, or wearable. The panel 262 may be configured as a single module integrated with the touch panel 252. The hologram device 264 may show a stereoscopic image in the air using interference of light. The projector 266 may project light onto a screen to display an image. The screen may be located, for example, in the interior of or on the exterior of the electronic device 201.

According to an embodiment of the present disclosure, the display 260 may further include a control circuit for controlling the panel 262, the hologram device 264, or the projector 266.

The interface 270 may include, for example, a HDMI 272, a USB 274, an optical interface 276, or a D-subminiature (D-sub) 278. The interface 270 may be included in, for example, the communication interface 170 illustrated in FIG. 1. Additionally or alternatively, the interface 270 may include, for example, a mobile high-definition link (MHL) interface, a SD card/multi-media card (MMC) interface, or an infrared data association (IrDA) standard interface.

The audio module 280 may, for example, convert a sound into an electrical signal, and vice versa. At least some elements of the audio module 280 may be included in, for example, the input/output interface 150 illustrated in FIG. 1. The audio module 280 may, for example, process sound information that is input or output through the speaker 282, the receiver 284, the earphones 286, the microphone 288, or the like.

The camera module 291 may be, for example, a device that can take a still image or a moving image, and according to an embodiment of the present disclosure, the camera module 291 may include one or more image sensors (e.g., a front sensor or a rear sensor), a lens, an ISP, or a flash (e.g., an LED or a xenon lamp).

The power management module 295 may, for example, manage power of the electronic device 201.

According to an embodiment of the present disclosure, the power management module 295 may include a power management integrated circuit (PMIC), a charger IC, or a battery or fuel gauge. The PMIC may use a wired and/or wireless charging method. Examples of the wireless charging method may include, for example, a magnetic resonance scheme, a magnetic induction scheme, an electromagnetic wave scheme, and the like. Further, the power management module 295 may further include additional circuits (e.g., a coil loop, a resonance circuit, a rectifier, etc.) for wireless charging. The battery gauge may measure, for example, a residual quantity of the battery 296, and a voltage, a current, or a temperature during the charging. The battery 296 may include, for example, a rechargeable battery and/or a solar battery.

The indicator 297 may indicate a specific state of the electronic device 201 or a part thereof (e.g., the AP 210), for example, a booting state, a message state, a charging state, or the like. The motor 298 may convert an electrical signal into a mechanical vibration, and may generate a vibration or haptic effect. Although not illustrated, the electronic device 201 may include a processing unit (e.g., a GPU) for mobile television (TV) support. The processing device for mobile TV support may, for example, process media data according to a standard of digital multimedia broadcasting (DMB), digital video broadcasting (DVB), media flow, or the like.

Each of the components of the electronic device according to the present disclosure may be implemented by one or more components and the name of the corresponding component may vary depending on a type of the electronic device. In various embodiments of the present disclosure, the electronic device may include at least one of the above-described elements. Some of the above-described elements may be omitted from the electronic device, or the electronic device may further include additional elements. Further, some of the elements of the electronic device according to various embodiments of the present disclosure may be coupled to form a single entity while performing the same functions as those of the corresponding elements before the coupling.

Figure 3:
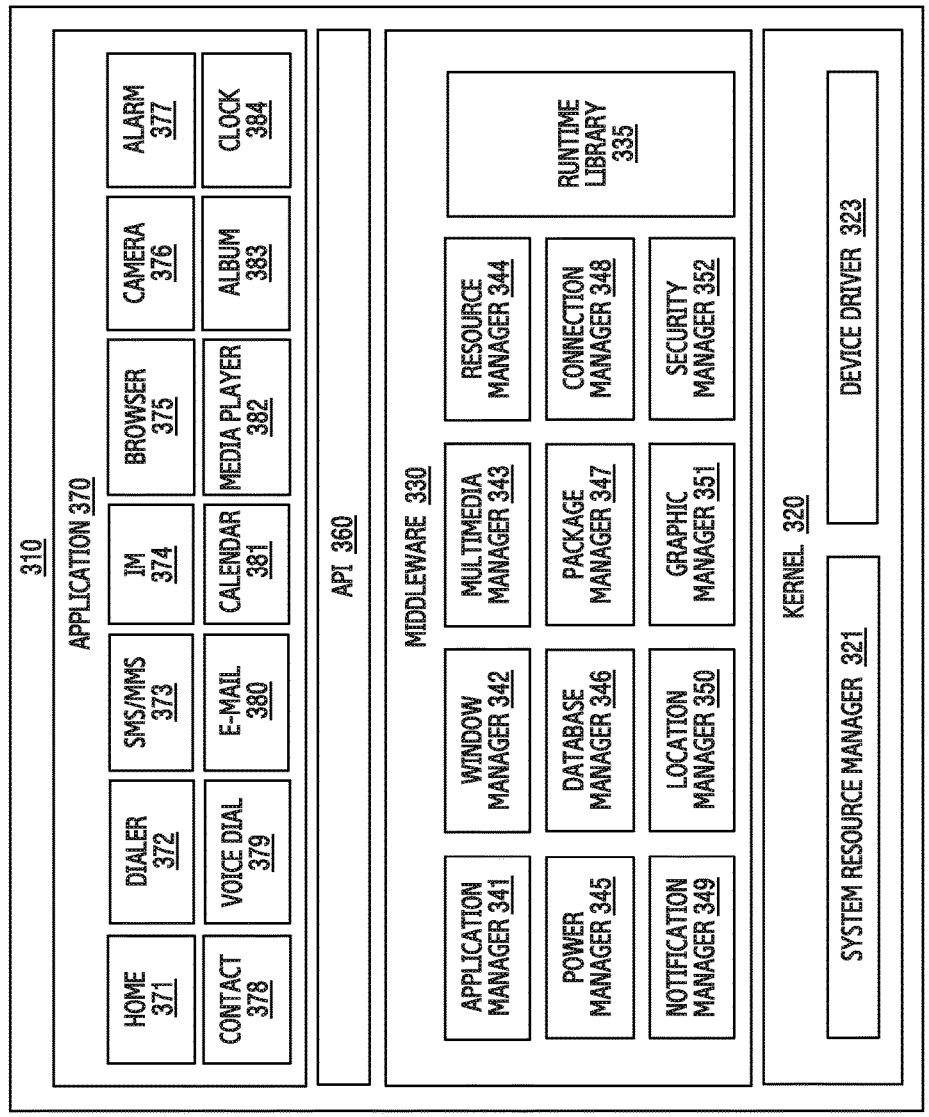
FIG. 3 is a block diagram of a program module according to an embodiment of the present disclosure.

FIG. 3 is a block diagram of a program module 310 according to various embodiments of the present disclosure.

Referring to FIG. 3, the program module 310 (e.g., the program 140) may include an OS that controls resources relating to an electronic device (e.g., the electronic device 101) and/or various applications (e.g., the application 147) executed in the operating system. The operating system may be, for example, Android, iOS™, Windows™, Symbian™, Tizen™, Bada™, or the like.

The program module 310 may include a kernel 320, middleware 330, an API 360, and/or applications 370. At least some of the program module 310 may be preloaded in the electronic device, or may be downloaded from an external electronic device (e.g., the electronic device (102, 104), the server 106).

The kernel 320 (e.g., the kernel 141 of FIG. 1) may include, for example, a system resource manager 321 or a device driver 323. The system resource manager 321 may control, allocate, or collect system resources.

According to an embodiment of the present disclosure, the system resource manager 321 may include a process management unit, a memory management unit, or a file system management unit. The device driver 323 may include, for example, a display driver, a camera driver, a BT driver, a shared-memory driver, a USB driver, a keypad driver, a Wi-Fi driver, an audio driver, or an inter-process communication (IPC) driver.

The middleware 330 may provide a function used by the applications 370 in common, or may provide various functions to the applications 370 through the API 360 to enable the applications 370 to efficiently use limited system resources in the electronic device.

According to an embodiment of the present disclosure, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module used by a complier in order to add a new function through a programming language during the execution of the applications 370. The runtime library 335 may perform input/output management, memory management, or a function for an arithmetic function.

The application manager 341 may manage, for example, a life cycle of at least one of the applications 370. The window manager 342 may manage graphical user interface (GUI) resources used by a screen. The multimedia manager 343 may identify a format used for reproducing various media files, and may encode or decode a media file using a codec suitable for the corresponding format. The resource manager 344 may manage resources of at least one of the applications 370, such as a source code, a memory, a storage space, and the like.

The power manager 345 may operate together with, for example, a basic input/output system (BIOS) to manage a battery or power and provide power information used for an operation of the electronic device. The database manager 346 may generate, search, or change a database to be used by at least one of the applications 370. The package manager 347 may manage installation or update of an application distributed in the format of a package file.

The connectivity manager 348 may manage, for example, a wireless connection, such as Wi-Fi or BT. The notification manager 349 may display or notify of an event, such as a received message, an appointment, and a proximity notification, in such a manner as not to disturb a user. The location manager 350 may manage location information of the electronic device. The graphic manager 351 may manage a graphic effect to be provided to a user, or a user interface related thereto. The security manager 352 may provide one or more security functions used for system security or user authentication.

According to an embodiment of the present disclosure, in cases where the electronic device (e.g., the electronic device 101) has a telephone call function, the middleware 330 may further include a telephony manager for managing a voice or video call function of the electronic device.

The middleware 330 may include a middleware module that forms combinations of various functions of the aforementioned elements. The middleware 330 may provide specialized modules according to the types of operating systems in order to provide differentiated functions. In addition, the middleware 330 may dynamically delete some of the existing elements, or may add new elements.

The API 360 (e.g., the API 145) may be, for example, a set of API programming functions, and may be provided with different configurations according to operating systems. For example, in the case of Android or iOS, one API set may be provided for each platform, and in the case of Tizen™, two or more API sets may be provided for each platform.

The applications 370 (e.g., the application 147) may include, for example, one or more applications that can provide functions, such as home 371, dialer 372, short message service (SMS)/multimedia messaging service (MMS) 373, instant message (IM) 374, browser 375, camera 376, alarm 377, contact 378, voice dialer 379, e-mail 380, calendar 381, media player 382, album 383, clock 384, health care (e.g., to measure exercise quantity or blood sugar), or environment information (e.g., atmospheric pressure, humidity, or temperature information).

According to an embodiment of the present disclosure, the applications 370 may include an application (hereinafter, referred to as an "information exchange application" for convenience of the description) that supports information exchange between the electronic device (e.g., the electronic device 101) and external electronic devices (e.g., the electronic devices 102 and 104). The information exchange application may include, for example, a notification relay application for transmitting specific information to the external electronic device, or a device management application for managing the external electronic device.

For example, the notification relay application may include a function of transferring, to an external electronic device (e.g., the electronic device 102 or 104), notification information generated from other applications of the electronic device (e.g., an SMS/MMS application, an e-mail application, a health management application, or an environmental information application). Furthermore, the notification relay application may, for example, receive notification information from an external electronic device and provide the received notification information to a user. The device management application may, for example, manage (e.g., install, delete, or update) at least one function of an external electronic device (e.g., the electronic device 104) communicating with the electronic device (for example, a function of turning on/off the external electronic device itself (or some elements thereof), or a function of adjusting luminance (or a resolution) of the display), applications operating in the external electronic device, or services provided by the external electronic device (e.g., a telephone call service or a message service).

According to an embodiment of the present disclosure, the applications 370 may include an application (e.g., a health care application) specified according to attributes (e.g., attributes of the electronic device such as the type of electronic device which corresponds to a mobile medical device) of the external electronic device (e.g., the electronic device 102 or 104).

According to one embodiment of the present disclosure, the applications 370 may include an application received from an external electronic device (e.g., the server 106 or the electronic device 102 or 104).

According to an embodiment of the present disclosure, the applications 370 may include a preloaded application or a third party application that can be downloaded from a server. The names of the elements of the program module 310, according to the embodiment illustrated in the drawing, may vary according to the type of operating system.

According to various embodiments of the present disclosure, at least a part of the program module 310 may be implemented in software, firmware, hardware, or a combination of two or more thereof. At least some of the program module 310 may be implemented (for example, executed) by, for example, the processor (for example, the AP 210). At least some of the program module 310 may include, for example, a module, program, routine, sets of instructions, process, or the like for performing one or more functions.

Figure 4:
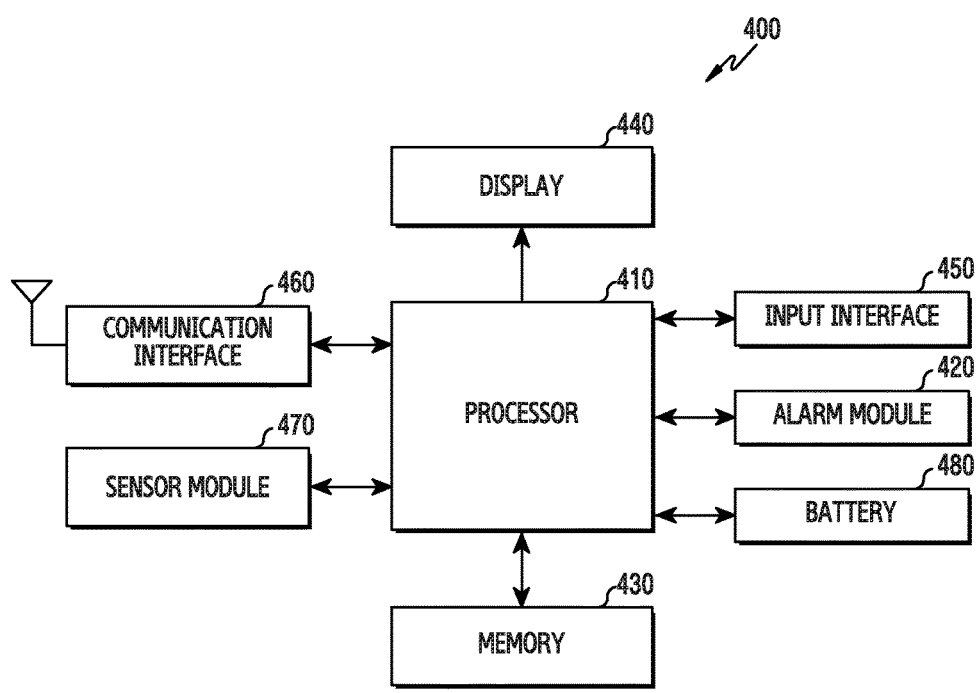
FIG. 4 is a block diagram of an electronic device for preventing battery swelling according to an embodiment of the present disclosure.
Figure 5A:
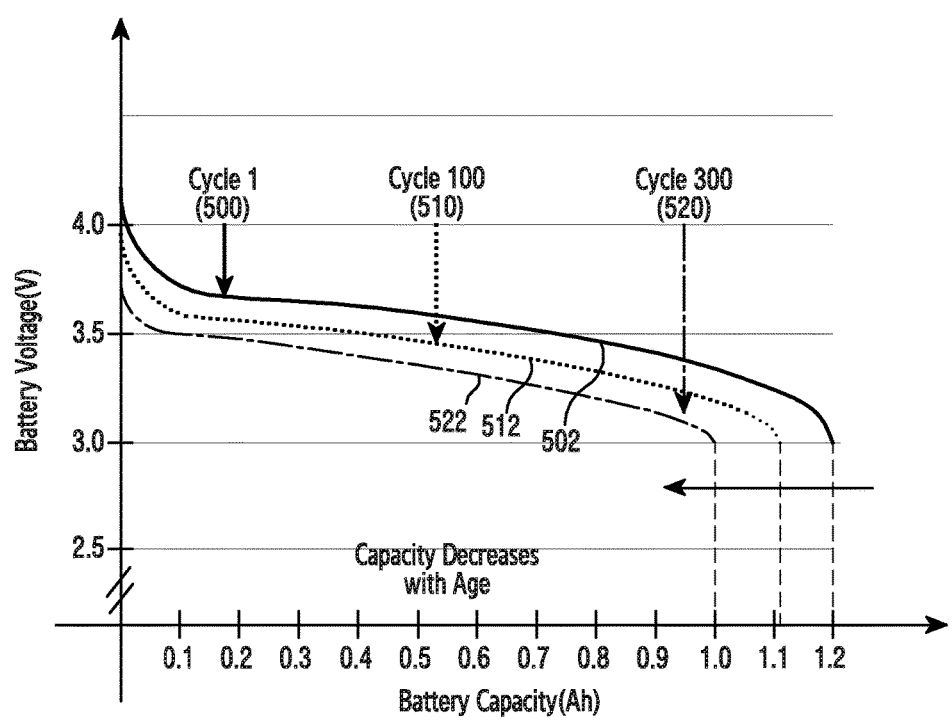
FIGS. 5A and 5B are graphs of state of charge (SoC) of a battery according to an embodiment of the present disclosure.
Figure 5B:
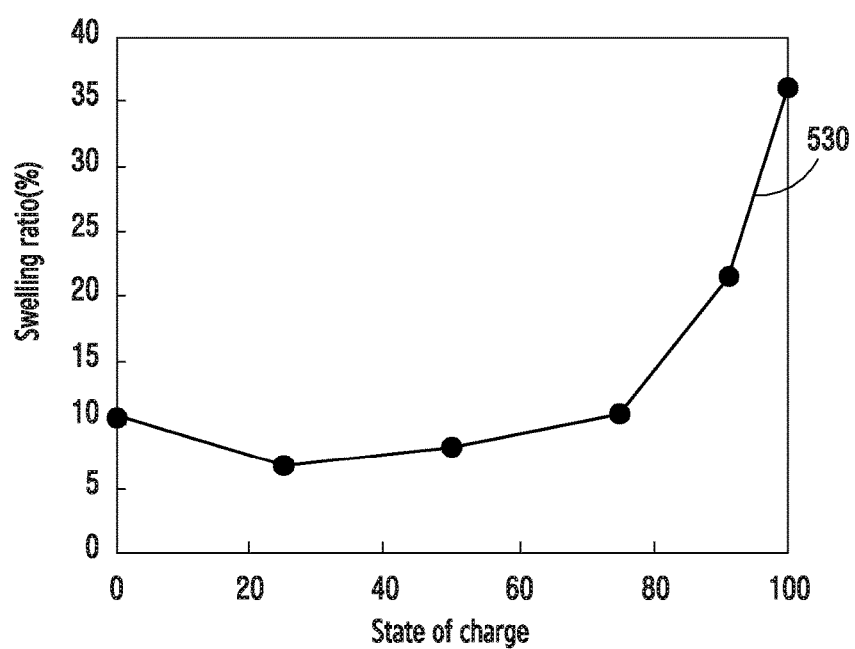

FIG. 4 is a block diagram of an electronic device for preventing battery swelling according to an embodiment of the present disclosure. FIGS. 5A and 5B are graphs of state of charge (SoC) of a battery according to an embodiment of the present disclosure. Hereafter, a method for determining whether to forcibly discharge a battery is explained using battery state of charge (SoC) graphs of FIGS. 5A and 5B.

Referring to FIG. 4, an electronic device 400 (e.g., the electronic device 101 of FIG. 1 or the electronic device 201 of FIG. 2) can include a processor 410 (e.g., including processing circuitry), an alarm module 420 (e.g., including alarm circuitry), a memory 430, a display 440 (e.g., including display circuitry), an input interface 450 (e.g., including input circuitry), a communication interface 460 (e.g., including communication circuitry), a sensor module 470 (e.g., including sensor circuitry), and a battery 480.

The electronic device 400 can include at least one processor 410 (e.g., the processor 120 of FIG. 1 or the processor 210 of FIG. 2). The processor 410 can include a CPU, an AP, or a CP.

The processor 410 can determine whether to force the battery 480 to discharge based on information of a temperature (an internal temperature) the electronic device 400 and SoC of the battery 480. For example, based on alarm information generated by the alarm module 420, the processor 410 can periodically check the temperature of the electronic device 400 and the SoC of the battery 480. For example, the processor 410 can be activated based on alarm information generated by the alarm module 420 in an inactive state (OFF), and check the temperature of the electronic device 400 and the SoC of the battery 480. For example, the processor 410 in the inactive state (OFF) can be activated based on a control signal received through a network control module (e.g., the communication interface 170) and check the temperature of the electronic device 400 and the SoC of the battery 480.

For example, as the number of charging times increases as shown in FIG. 5A, a maximum voltage (or full capacity) can decrease. More specifically, at initial charging (cycle 1, illustrated by line 502) 500, the battery 480 can be charged to a voltage 504 of maximum 4.25V. When the battery 480 is charged 100 times (cycle 100, illustrated by line 512) 510, it can be charged to a voltage 512 of maximum 4V. When the battery 480 is charged 300 times (cycle 300, illustrated by line 522) 520, it can be charged to a voltage 512 of maximum 3.8V. By contrast, a relationship between the SoC (or a charging rate) 530 of the battery 480 and the battery swelling can be constant regardless of the number of the charging times as shown in FIG. 5B. Hence, the processor 410 can determine whether to force the battery 480 to discharge based on the information of the temperature of the electronic device 400 and the SoC of the battery 480.

When the temperature of the electronic device 400 exceeds a reference temperature and the battery SoC exceeds a reference SoC, the processor 410 can determine to force the battery 480 to discharge. For example, the reference temperature is a preset temperature (e.g., 60° C.) to determine whether to force the battery 480 to discharge, and can be altered by swelling ratio information of the battery 480 corresponding to a temperature change of the electronic device 400. The reference battery SoC is a preset battery charging rate (e.g., 96%) to determine whether to force the battery 480 to discharge, and can be altered by the swelling ratio information of the battery 480 corresponding to a SoC change of the battery 480.

When determining to force the battery 480 to discharge, the processor 410 can execute an arbitrary operation to discharge the battery 480. For example, the processor 410 can execute a predefined arbitrary operation or a program (or an operation) in a battery discharge mode.

To discharge the battery 480, the processor 410 can drive at least one module. For example, the processor 410 can drive the display 440, a camera module, and the sensor module 470. For example, the arbitrary operation of the processor 410 for discharging the battery 480 can include an operation for driving the display 440, the camera module, and the sensor module 470.

When the electronic device 400 includes a plurality of processors 410, the processors 410 can determine a discharge quantity of the battery 480 based on the temperature of the electronic device 400 and the SoC of the battery 480. Based on the discharge quantity of the battery 480, the processors 410 can determine at least one of at least one processor 410 for executing an arbitrary operation and an operating frequency of the corresponding processor 410. For example, when the discharge quantity of the battery 480 increases, the processors 410 can select the processor 410 which consumes considerable power. When the discharge quantity of the battery 480 increases, the processors 410 can increase the operating frequency of the processor 410 so as to raise the power consumption of the processor 410.

When determining to force the battery 480 to discharge, the processor 410 can discharge the battery 480 through an extra current source port or an extra low drop output (LDO) port of a PMIC. For example, the processor 410 can determine the discharge quantity of the battery 480 based on the temperature of the electronic device 400 and the SoC information of the battery 480. Based on the discharge quantity of the battery 480, the processor 410 can determine a current value to output through the extra current source port or a voltage value to output through the extra LDO port. For example, the processor 410 can determine the current value to output through the extra current source port or the voltage value to output through the extra LDO port, in proportion to the discharge quantity of the battery 480.

When the processor 410 is inactive, the electronic device 400 can control a separate control module to discharge the battery 480 through the extra current source port or the extra LDO port of the PMIC.

The alarm module 420 can generate an alarm at a preset time. For example, the alarm module 420 can include a real time clock (RTC) alarm.

The memory 430 can store commands or data regarding the components of the electronic device 400.

The display 440 can display various contents (e.g., texts, images, videos, icons, or symbols) to a user.

The input interface 450 can forward a command or data for controlling the electronic device 400, which is input from the user or other external device, to the other component(s) of the electronic device 400. For example, the input interface 450 can include a key pad, a dome switch, a physical button, a touchpad (resistive/capacitive), and a jog & shuttle.

The communication interface 460 can deliver signals between the electronic device 400 and an external device (e.g., another electronic device or a server). The communication interface 460 can include a cellular module and a non-cellular module. The non-cellular module can enable the communication between the electronic device 400 and another electronic device and/or a server using a short-range wireless communication scheme. For example, the communication interface 460 can be connected to a network through wireless or wired communication and thus communicate with the external device.

The sensor module 470 can generate sensor data by converting measurement information of a physical quantity or detection information of an operation state of the electronic device 400 to an electric signal. For example, the sensor module 470 can include a temperature sensor for measuring the temperature of the electronic device 400. Herein, the temperature of the electronic device 400, which is the internal temperature of the electronic device 400, can include a temperature of the battery 480 or a temperature of the processor 410.

The battery 480 is a power source of the electronic device 400, and can supply power for driving the electronic device 400. For example, the battery 480 can include at least one battery cell for storing the power and the PMIC for controlling the power supply of the battery 480.

The alarm module 420 can be disposed in the processor 410 or in the PMIC.

Figure 6A:
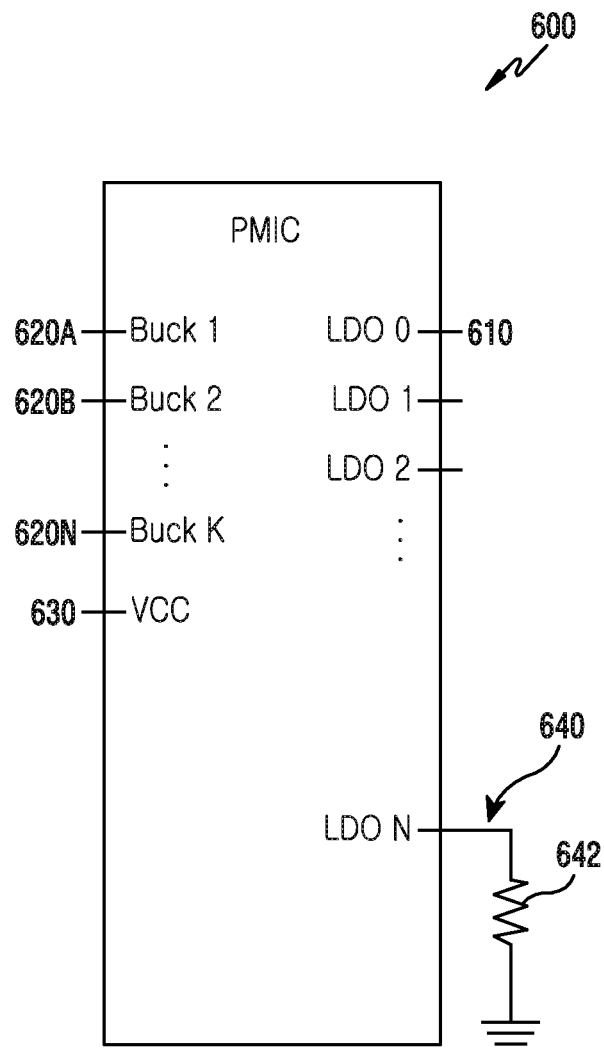
FIGS. 6A and 6B are block diagrams of a power management integrated circuit (PMIC) for discharging a battery according to an embodiment of the present disclosure.
Figure 6B:
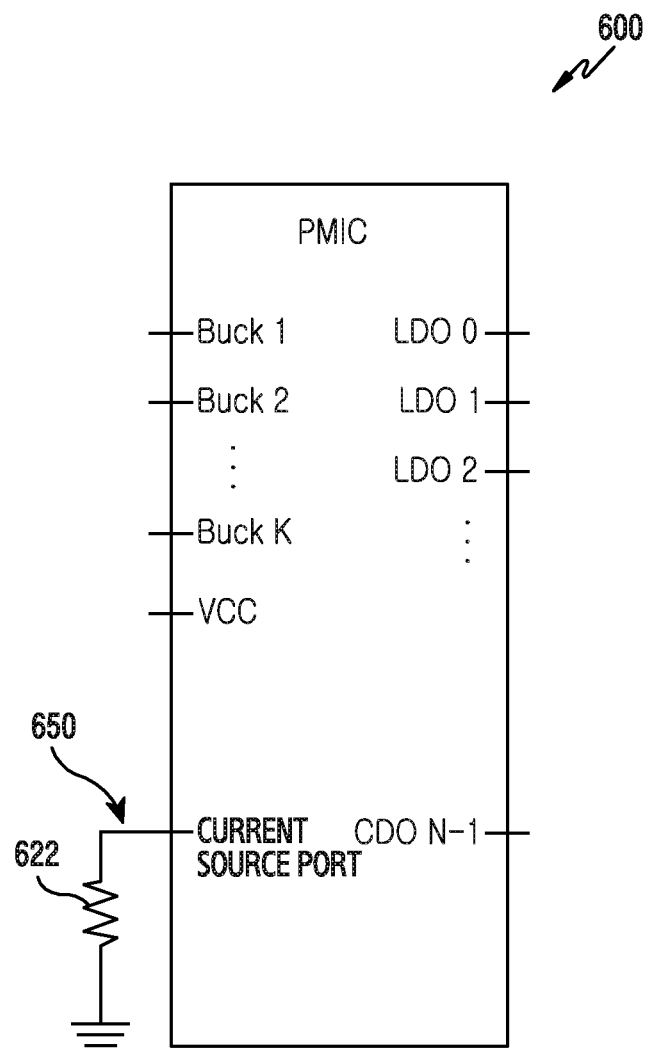

FIGS. 6A and 6B are block diagrams of a PMIC for battery discharge according to an embodiment of the present disclosure.

Referring to FIG. 6A, the PMIC 600 can include a plurality of LDOs 610, a plurality of buck converters 620, and a power supply (vcc) 630.

The PMIC 600 adds a resistor 642 to an extra LDO N port 640 which is not connected to the component of the electronic device 400 among the LDOs 610, and can include a port for forcing the battery discharge. For example, the processor 410 can control the battery discharge quantity by regulating voltage of the LDO N port 640. In this case, the extra LDO N port 640 of the PMIC 600 can determine battery discharge performance based on performance of the resistor 642.

Referring to FIG. 6B, the PMIC 600 can include a plurality of LDOs 610, a plurality of buck converters 620, a power supply (vcc) 630, and a current source port 650.

The PMIC 600 adds a resistor 622 to the extra current source port 650 and can include a port for forcing the battery discharge. For example, the processor 410 can control the battery discharge quantity by regulating current of the current source port 650.

Figure 7:
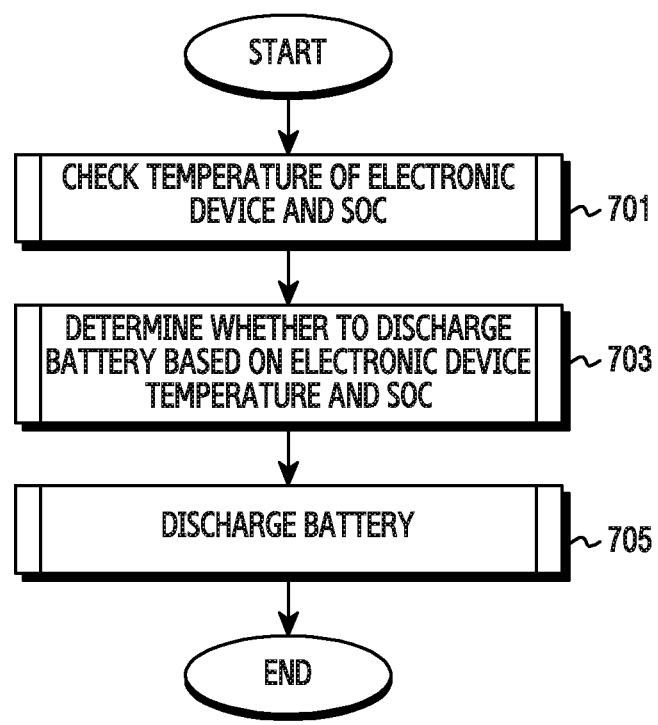
FIG. 7 is a flowchart of a method for preventing battery swelling in an electronic device according to an embodiment of the present disclosure.

FIG. 7 is a flowchart of a method for preventing battery swelling in an electronic device according to an embodiment of the present disclosure.

Referring to FIG. 7, in operation 701, the electronic device (e.g., the electronic device 101, 201, or 400) can check its temperature and the SoC of the battery (e.g., the battery 480). For example, the processor 410 of the electronic device 400 can obtain the internal temperature of the electronic device 400 measured by the sensor module 470. The processor 410 can obtain the SoC of the battery cell provided from the battery 480.

In operation 703, the electronic device can determine to discharge the battery based on the temperature of the electronic device and the battery SoC. For example, based on the temperature of the electronic device and the battery SoC, the processor 410 of the electronic device 400 can determine whether a battery discharge event for preventing battery swelling is triggered.

In operation 705, when determining to discharge the battery, the electronic device can force the battery to discharge in order to prevent the battery swelling. For example, the processor 410 can execute an arbitrary operation for the battery discharge. For example, the processor 410 can discharge the battery using at least one of the LDO port and the current source port for the forced discharge in the PMIC 600.

Figure 8:
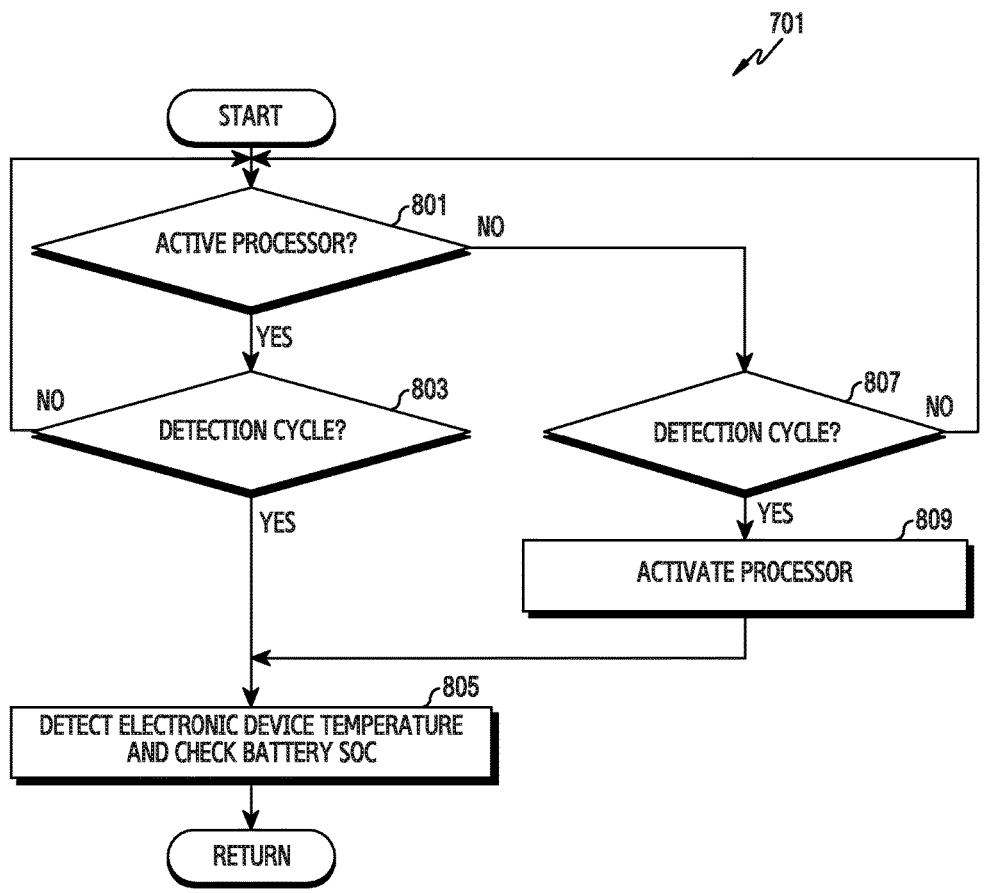
FIG. 8 is a flowchart of a method for checking a temperature and battery SoC in an electronic device according to an embodiment of the present disclosure.

FIG. 8 is a flowchart of a method for checking a temperature and battery SoC in an electronic device according to an embodiment of the present disclosure. Now, the operation 701 for checking the temperature of the electronic device and the battery SoC in FIG. 7 is explained.

Referring to FIG. 8, in operation 801, the electronic device (e.g., the electronic device 101, 201, or 400) can determine whether the processor is active. For example, the electronic device 400 can determine whether power is supplied to the processor 410. When the power is supplied to the processor 410, the electronic device 400 can determine the active processor 410. When the power supply to the processor 410 is cut off, the electronic device 400 can determine the inactive processor 410. Herein, the active processor state can include an idle mode of the processor or the electronic device.

When the processor is active, the electronic device can determine whether a detection cycle arrives in operation 803. For example, the processor 410 can determine whether the alarm module 420 outputs an alarm. When the alarm module 420 outputs an alarm, the processor 410 can determine arrival of the detection cycle. When the alarm module 420 outputs no alarm, the processor 410 can determine that the detection cycle does not arrive. Herein, the alarm module 420 can be separated from the processor 410 or included in the processor 410.

When the detection cycle does not arrive, the electronic device can determine whether the processor is active in operation 801.

When the detection cycle arrives, the electronic device can detect its temperature and check the SoC of the battery (e.g., the battery 480) in operation 805.

When the processor is inactive, the electronic device can determine whether the detection cycle arrives in operation 807. For example, the alarm module 420 can determine whether a preset alarm time arrives. Herein, the alarm module 420 can be included in the PMIC or separated from the PMIC.

When the detection cycle does not arrive, the electronic device can determine whether the processor is active in operation 801.

When the detection cycle arrives, the electronic device can activate the inactive processor in operation 809. For example, when the alarm module 420 (e.g., RTC alarm) outputs an alarm, the PMIC 600 of the electronic device 400 can supply the power to the inactive processor 410 and thus activate the processor 410 for a desired time.

When the processor is active, the electronic device can check its temperature and the battery SoC in operation 805.

When the electronic device (e.g., the electronic device 101, 201, or 400) includes a network control module, it can activate the inactive processor 410 for a desired time based on a control signal remotely received via the network control module. For example, when the processor 410 is inactive, the electronic device 400 can periodically receive the control signal for activating the processor 410 via the network control module.

Figure 9:
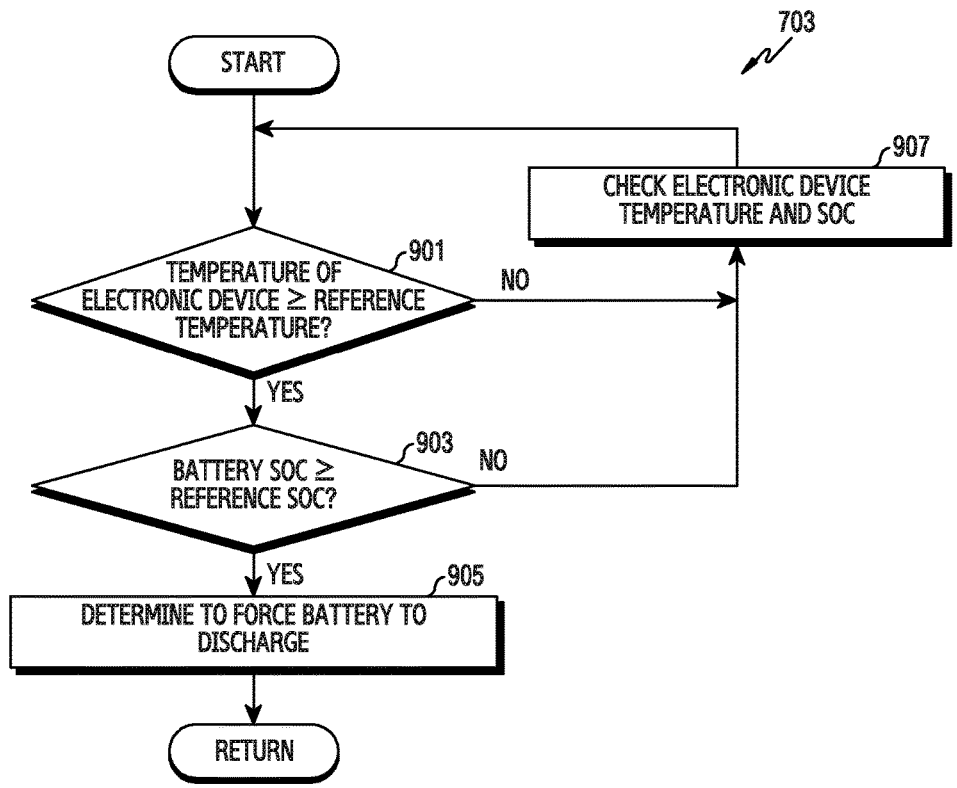
FIG. 9 is a flowchart of a method for determining whether to discharge a battery in an electronic device according to an embodiment of the present disclosure.

FIG. 9 is a flowchart of a method for determining whether to discharge a battery in an electronic device according to an embodiment of the present disclosure. Now, the operation 703 for determining whether to discharge the battery in FIG. 7 is explained.

Referring to FIG. 9, in operation 901, the electronic device (e.g., the electronic device 101, 201, or 400) can compare its temperature with a reference temperature so as to determine whether its temperature is greater than or equal to the reference temperature. For example, the reference temperature is a preset temperature (e.g., 60° C.) to determine whether to force the battery 480 to discharge, and can be altered by the swelling ratio information of the battery (e.g., the battery 480) corresponding to a temperature change of the electronic device 400.

When the temperature of the electronic device is greater than or equal to the reference temperature, the electronic device can compare a battery SoC with a reference SoC in order to determine whether the battery SoC is greater than or equal to the reference SoC in operation 903. For example, the reference battery SoC is a preset battery charging rate (e.g., 96%) to determine whether to force the battery 480 to discharge, and can be altered by the swelling ratio information of the battery corresponding to a SoC change of the battery 480.

When the battery SoC is greater than or equal to the reference SoC, the electronic device can determine to force the battery to discharge in order to prevent battery swelling in operation 905.

When the temperature of the electronic device falls below the reference temperature or the battery SoC falls below the reference SoC, the electronic device can check its temperature and the battery SoC in operation 907. For example, the processor 410 can periodically check the temperature of the electronic device 400 and the SoC of the battery 480 in operation 701 of FIG. 7.

According to various embodiments of the present disclosure, after comparing the battery SoC and the reference SoC, the electronic device can compare its temperature and the reference temperature. In this case, when the battery SoC exceeds the reference SoC, the electronic device can measure and compare its temperature with the reference temperature.

When the temperature of the electronic device exceeds the reference temperature, the electronic device can check and compare the battery SoC with the reference SoC.

Figure 10:
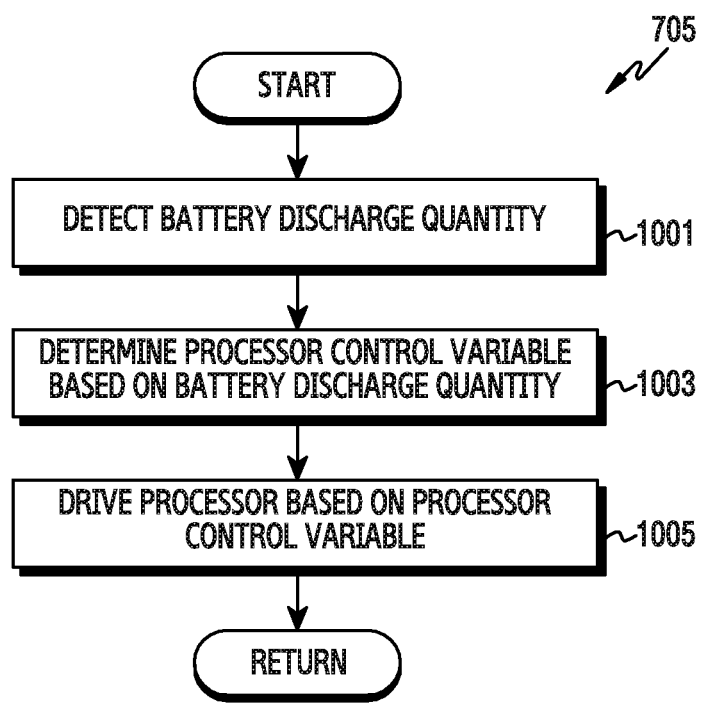
FIG. 10 is a flowchart of a method for discharging a battery using a processor in an electronic device according to an embodiment of the present disclosure.

FIG. 10 is a flowchart of a method for discharging a battery using a processor in an electronic device according to an embodiment of the present disclosure. Now, the operation 705 for discharging the battery in FIG. 7 is explained.

Referring to FIG. 10, in operation 1001, the electronic device (e.g., the electronic device 101, 201, or 400) can detect the battery discharge quantity. For example, when determining to discharge the battery in order to prevent the battery 480 from swelling, the processor 410 can calculate the battery discharge quantity based on the temperature of the electronic device and the battery SoC.

In operation 1003, the electronic device can determine a control variable of the processor based on the battery discharge quantity. Herein, the processor control variable can include a processor type and a processor operating frequency. For example, the electronic device 400 can determine the operating frequency of the processor 410 for the battery discharge based on the battery discharge quantity. For example, when the electronic device 400 includes a plurality of processors 410, the electronic device 400 can select the processor 410 for driving the battery discharge based on the battery discharge quantity. For example, when the electronic device 400 includes a plurality of processors 410, the electronic device 400 can select the processor 410 for driving the battery discharge based on the battery discharge quantity and determine the operating frequency of the processor 410.

In operation 1005, the electronic device can drive the processor based on the processor control variable determined in operation 1003. For example, the electronic device 400 can drive the processor 410 at the operating frequency determined in operation 1003. In this case, the processor 410 can execute an arbitrary operation based on the operating frequency. For example, the electronic device 400 can drive at least one processor selected in operation 1003. In this case, at least one processor can execute an arbitrary operation for the battery discharge. For example, the electronic device 400 can drive at least one processor selected in operation 1003 at the operating frequency determined in operation 1003.

Figure 11:
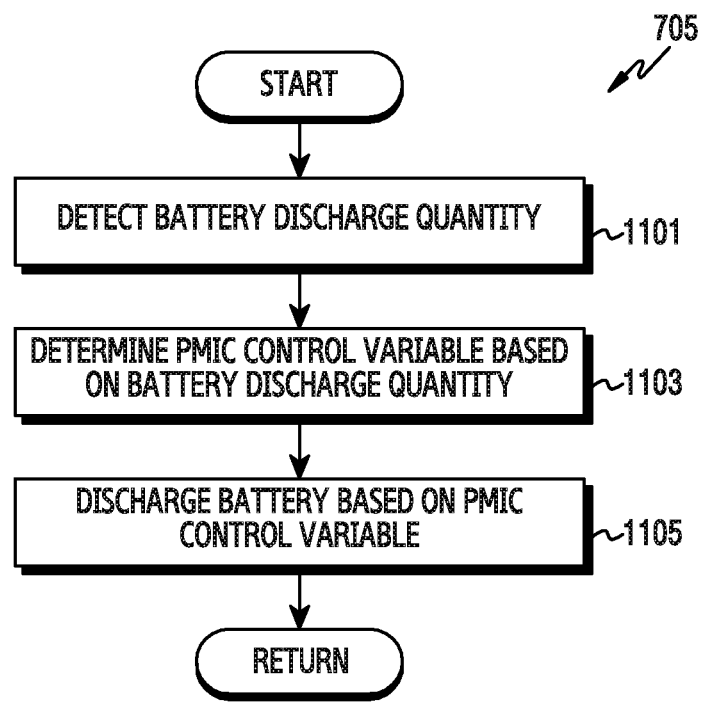
FIG. 11 is a flowchart of a method for discharging a battery using a PMIC in an electronic device according to an embodiment of the present disclosure.

FIG. 11 is a flowchart of a method for discharging a battery using a PMIC in an electronic device according to an embodiment of the present disclosure. Now, the operation 705 for discharging the battery in FIG. 7 is explained.

Referring to FIG. 11, in operation 1101, the electronic device (e.g., the electronic device 101, 201, or 400) can detect the battery discharge quantity. For example, when determining to discharge the battery in order to prevent the battery 480 from swelling, the processor 410 can calculate the battery discharge quantity by comparing the reference SoC corresponding to the temperature of the electronic device with the battery SoC.

In operation 1103, the electronic device can determine a PMIC control variable based on the battery discharge quantity. Herein, the PMIC control variable can include the voltage value of the LDO port or the current value of the current source port. For example, the processor 410 can determine a voltage level to output through the LDO N port 640 of the PMIC 600 for the battery discharge based on the battery discharge quantity. For example, the processor 410 can determine a current level to output through the current source port 650 of the PMIC 600 for the battery discharge based on the battery discharge quantity.

In operation 1105, the electronic device can discharge the battery based on the PMIC control variable determined in operation 1103. For example, the electronic device 400 can output the power through the LDO N port 640 with the voltage value determined in operation 1103. For example, the electronic device 400 can output the current through the current source port 650 with the current value determined in operation 1103.

The electronic device (e.g., the electronic device 101, 201, or 400) can drive at least one module for the battery discharge. For example, the electronic device can drive a display (e.g., the display 160, 260, or 440, the camera module 291, the sensor module 240 or 470). For example, the arbitrary operation of the processor 410 for the battery discharge can include an operation for driving the display (e.g., the display 160, 260, or 440, the camera module 291, the sensor module 240 or 470).

Figure 12:
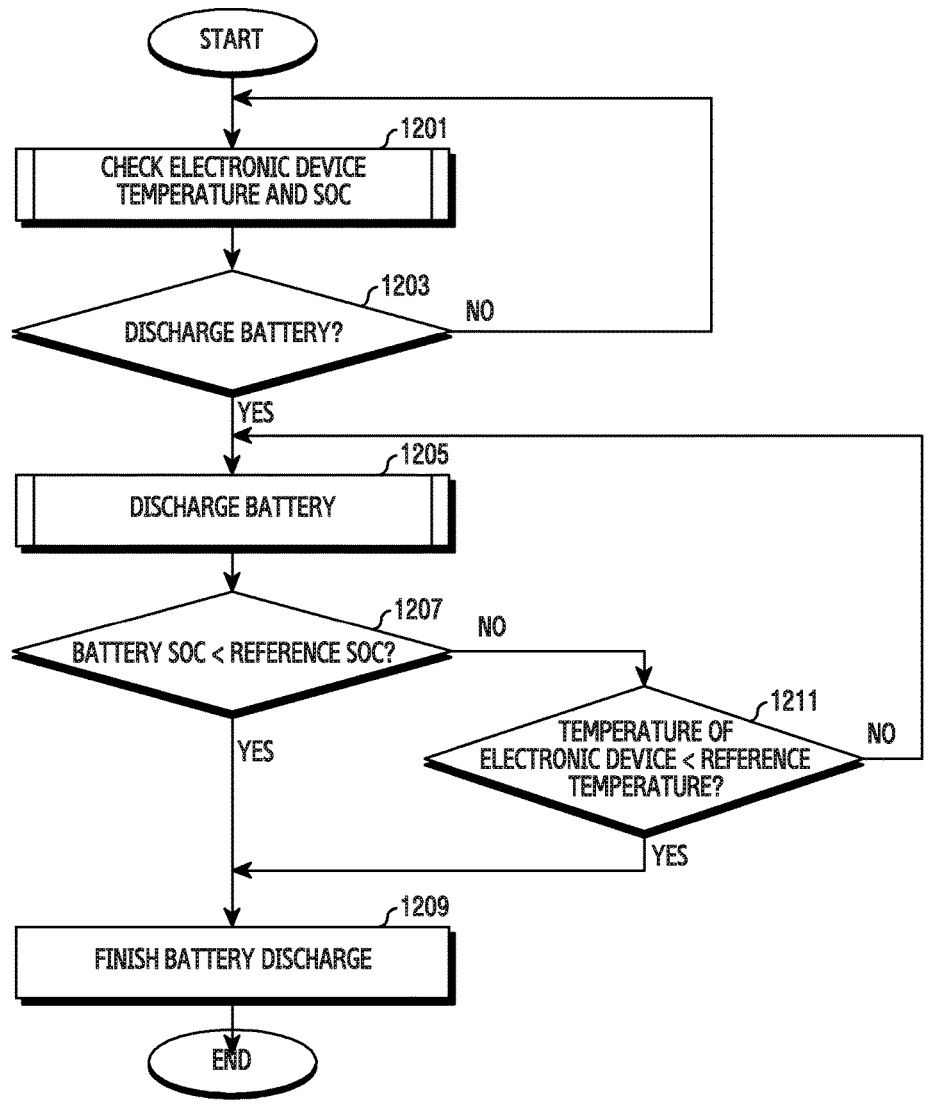
FIG. 12 is a flowchart of a method for terminating battery discharging in an electronic device according to an embodiment of the present disclosure.

FIG. 12 is a flowchart of a method for finishing battery discharge in an electronic device according to an embodiment of the present disclosure.

Referring to FIG. 12, in operation 1201, the electronic device (e.g., the electronic device 101, 201, or 400) can check its temperature and the battery SoC. For example, the processor 410 can periodically check the internal temperature of the electronic device 400 through the sensor module 470 and check the SoC of the battery 480 in operation 701 of FIG. 7.

In operation 1203, the electronic device can determine whether to discharge the battery based on its temperature and the battery SoC. For example, as in operation 703 of FIG. 7, the processor 410 can determine whether a battery discharge event for preventing battery swelling takes place based on the temperature of the electronic device and the battery SoC.

When determining not to discharge the battery, the electronic device can check its temperature and the battery SoC in operation 1201. For example, when a detection cycle arrives, the processor 410 can check the temperature of the electronic device and the battery SoC.

When determining to discharge the battery, the electronic device can force the battery the discharge in operation 1205. For example, the processor 410 can discharge the battery using its arbitrary operation or the extra port of the PMIC in operation 705 of FIG. 7.

In operation 1207, the electronic device can compare the battery SoC with the reference SoC in order to determine whether the battery SoC during the charging falls below the reference SoC.

When the battery SoC during the charging exceeds the reference SoC, the electronic device can compare its temperature and the reference temperature in order to determine whether its temperature falls below the reference temperature in operation 1211.

When the battery SoC during the charging exceeds the reference SoC and the temperature of the electronic device exceeds the reference temperature, the electronic device can continue the battery discharge in operation 1205.

When the battery SoC during the charging falls below the reference SoC or the temperature of the electronic device falls below the reference temperature, the electronic device can finish the battery discharge in operation 1209. For example, when the battery SoC during the charging falls below the reference SoC or the temperature of the electronic device falls below the reference temperature, the processor 410 can end the arbitrary operation for the battery discharge. For example, when the battery SoC during the charging falls below the reference SoC or the temperature of the electronic device falls below the reference temperature, the processor 410 can end the power supply of the PMIC for the battery discharge.

During the battery discharge, the electronic device can periodically check the battery SoC and its temperature and thus determine whether to terminate the battery discharge.

According to various embodiments of the present disclosure, the electronic device can further determine a processor driving time for the battery discharge based on the battery discharge quantity in FIG. 10. In this case, the processor driving for the battery discharge can execute an arbitrary operation during the driving time. That is, when the driving time expires, the processor driving for the battery discharge can automatically end the battery discharge driving.

According to various embodiments of the present disclosure, the electronic device can further determine a battery discharge time based on the battery discharge quantity in FIG. 11. In this case, the processor 410 can output the power through the LDO N port 640 or the current source port 650 during the battery discharge time. That is, when the battery discharge time expires, the processor can automatically end the battery discharge.

As set forth above, the electronic device and its operating method can force the battery to discharge based on the temperature of the electronic device and the SoC, and thus prevent the battery swelling.

Since the inactive (OFF) processor is periodically activated and determines whether to discharge the battery of the electronic device, the electronic device and its operating method can prevent the battery swelling with the inactive processor.

When determining to discharge the battery to prevent the battery swelling, the electronic device and its operating method can discharge the battery by driving the processor. Thus, the battery swelling can be prevented without having to add a hardware module for the battery swelling prevention.

When determining to discharge the battery to prevent the battery swelling, the electronic device and its operating method can discharge the battery using the PMIC. Thus, the battery swelling can be prevented without having to add a hardware module for the battery swelling prevention.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an application-specific integrated circuit (ASIC) chip, a field-programmable gate arrays (FPGA), and a programmable-logic device for performing operations which has been known or are to be developed hereinafter.

According to various embodiments of the present disclosure, at least some of the devices (for example, modules or functions thereof) or the method (for example, operations) according to the present disclosure may be implemented by a command stored in a computer-readable storage medium in a program module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (for example, a magnetic tape), optical media (for example, a compact disc ROM (CD-ROM) and a digital versatile disc (DVD)), magneto-optical media (for example, a floptical disk), a hardware device (for example, a ROM, a RAM, a flash memory), and the like. In addition, the program instructions may include high class language codes, which can be executed in a computer by using an interpreter, as well as machine codes made by a compiler. Any of the hardware devices as described above may be configured to work as one or more software modules in order to perform the operations according to various embodiments of the present disclosure, and vice versa.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:
1. An electronic device comprising:
a battery;
a sensor module;
a processor electrically connected to the sensor module; and
a memory electrically connected to the processor,
wherein the memory stores instructions which, when executed, direct the processor to:
detect a temperature of the electronic device using the sensor module,
determine a state of charge (SoC) of the battery,
determine whether to discharge the battery based on the temperature of the electronic device and the SoC of the battery, and
discharge the battery in response to the battery discharge determination,
wherein determining whether to discharge the battery includes comparing at least one of the temperature of the electronic device or the SoC of the battery against a preset value, the preset value changed based on a change of swelling ratio information, the change of the swelling ratio information determined according to a number of battery chargings performed previously.

2. The electronic device of claim 1, wherein the processor, in an inactive state, is activated in response to an alarm event, detects the temperature of the electronic device using the sensor module, and determines the SoC of the battery.

3. The electronic device of claim 2, further comprising:
a power management integrated circuit (PMIC),
wherein the alarm event is generated by a real time clock (RTC) alarm of the PMIC.

4. The electronic device of claim 1, wherein the sensor module comprises:
a temperature sensor configured to measure a temperature of the processor or a temperature of the battery.

5. The electronic device of claim 1, wherein the instructions comprise instructions directing the processor to periodically detect the temperature of the electronic device using the sensor module and to check the SoC of the battery.

6. The electronic device of claim 1, wherein the instructions direct the processor to, when the temperature of the electronic device exceeds a first reference value and the SoC of the battery exceeds a second reference value, determine to discharge the battery.

7. The electronic device of claim 1, wherein the instructions direct the processor to execute an arbitrary operation for the battery discharge.

8. The electronic device of claim 7, wherein the instructions direct the processor to determine at least one of a processor for executing the arbitrary operation and an operating frequency of the determined processor.

9. The electronic device of claim 7, wherein the instructions direct the processor to determine at least one module for executing the arbitrary operation.

10. The electronic device of claim 1, further comprising:
a PMIC,
wherein the instructions direct the processor to discharge the battery through at least one port of the PMIC.

11. The electronic device of claim 10, wherein the PMIC comprises at least one of a current source port and a low drop output (LDO) port for the battery discharge.

12. An operating method of an electronic device, the operating method comprising:
determining a temperature of the electronic device and a state of charge (SoC) of a battery;
determining whether to discharge the battery based on the temperature of the electronic device and the SoC of the battery; and
discharging the battery in response to the battery discharge determination,
wherein the determining of whether to discharge the battery includes comparing at least one of the temperature of the electronic device or the SoC of the battery against a preset value, the preset value changed based on a change of swelling ratio information, the change of the swelling ratio information determined according to a number of battery chargings performed previously.

13. The operating method of claim 12, wherein the determining of the temperature of the electronic device and the SoC of the battery comprises:
   activating at least one inactive processor in response to an alarm event; and
   determining the temperature of the electronic device and the SoC of the battery through the at least one activated processor.

14. The operating method of claim 13, wherein the alarm event is generated by a real time clock (RTC) alarm of a power management integrated circuit (PMIC).

15. The operating method of claim 12, wherein the temperature of the electronic device comprises at least one of a temperature of a processor and a temperature of the battery.

16. The operating method of claim 12, wherein the determining of the temperature of the electronic device and the SoC of the battery comprises:
   periodically determining the temperature of the electronic device and the SoC of the battery.

17. The operating method of claim 12, wherein the determining of whether to discharge the battery comprises:
   when the temperature of the electronic device exceeds a first reference value and the SoC of the battery exceeds a second reference value, determining to discharge the battery.

18. The operating method of claim 12, wherein the discharging of the battery comprises:
   executing an arbitrary operation through at least one processor of the electronic device.

19. The operating method of claim 18, further comprising:
   determining at least one of a processor for executing the arbitrary operation and an operating frequency of the determined processor.

20. The operating method of claim 18, further comprising:
   determining at least one module for executing the arbitrary operation.

* * * * *